(12) United States Patent
Krishnamachari et al.

(10) Patent No.: US 10,869,279 B2
(45) Date of Patent: Dec. 15, 2020

(54) ANTENNA-PARAMETER CONTROL IN A DISTRIBUTED SYSTEM

(71) Applicant: ARRIS Enterprises LLC, Suwanee, GA (US)

(72) Inventors: Anand Krishnamachari, San Jose, CA (US); William Buel, San Jose, CA (US); Craig Owens, San Carlos, CA (US); Eran Dor, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/547,556

(22) Filed: Aug. 21, 2019

(65) Prior Publication Data

US 2020/0015170 A1 Jan. 9, 2020

Related U.S. Application Data

(63) Continuation of application No. 16/025,528, filed on Jul. 2, 2018, now Pat. No. 10,433,260.

(60) Provisional application No. 62/528,069, filed on Jul. 1, 2017.

(51) Int. Cl.
*H04W 52/18* (2009.01)
*H04W 16/28* (2009.01)
*H04W 64/00* (2009.01)

(52) U.S. Cl.
CPC .......... *H04W 52/18* (2013.01); *H04W 16/28* (2013.01); *H04W 64/00* (2013.01)

(58) Field of Classification Search
CPC .... H04B 17/102; H04W 16/28; H04W 52/18; H04W 52/26; H04W 52/262; H04W 52/267; H04W 52/367; H04W 52/42; H04W 64/00

USPC ................ 455/41.1, 41.2, 130, 67.14, 562.1; 370/278, 328; 342/175; 343/703
See application file for complete search history.

(56) References Cited

U.S. PATENT DOCUMENTS

| | | |
|---|---|---|
| 7,123,939 B1 | 10/2006 | Bird et al. |
| 7,257,425 B2 | 8/2007 | Wang et al. |
| 10,433,260 B1 * | 10/2019 | Krishnamachari ... H04W 52/26 |
| 2004/0116084 A1 * | 6/2004 | Ward ..................... H01Q 23/00 455/130 |
| 2004/0204102 A1 * | 10/2004 | Kuehnel ............... H04B 1/3816 455/562.1 |
| 2005/0085197 A1 | 4/2005 | Laroia et al. |
| 2007/0262912 A1 | 11/2007 | Eckwielen et al. |

(Continued)

*Primary Examiner* — Tan H Trinh
(74) *Attorney, Agent, or Firm* — Steven Stupp; Stewart Wiener

(57) ABSTRACT

An electronic device that provides modified electrical signals is described. An interface circuit in the electronic device may provide electrical signals for an antenna module, which may be coupled to the interface circuit by a cable, and the electrical signals may correspond to or may specify an output transmit-power level at the interface circuit. Then, the interface circuit may receive feedback about an input transmit-power level at the antenna module. Based on the feedback, a data rate and/or a modulation and coding scheme, the interface circuit may provide the modified electrical signals for the antenna module, where the modified electrical signals correspond to a modified output transmit-power level at the interface circuit. In some embodiments, the feedback is provided by repurposing, during a different operating mode, signal lines that otherwise specify an antenna pattern.

20 Claims, 6 Drawing Sheets

(56) References Cited

U.S. PATENT DOCUMENTS

| | | | |
|---|---|---|---|
| 2008/0175175 A1* | 7/2008 | Oren | H04B 17/12 370/279 |
| 2010/0245053 A1 | 9/2010 | Overhultz et al. | |
| 2011/0002279 A1 | 1/2011 | Yang et al. | |
| 2011/0298672 A1* | 12/2011 | Otto | H01Q 3/08 343/703 |
| 2013/0094440 A1* | 4/2013 | Moshfeghi | H04B 7/043 370/328 |
| 2014/0018020 A1 | 1/2014 | Suh et al. | |
| 2014/0113676 A1 | 4/2014 | Hamalainen et al. | |
| 2014/0119244 A1 | 5/2014 | Steer et al. | |
| 2014/0170999 A1 | 6/2014 | Aparin | |
| 2014/0226748 A1 | 8/2014 | Dorosenco | |
| 2016/0165551 A1 | 6/2016 | Lagnado | |
| 2016/0178730 A1* | 6/2016 | Trotta | G01S 7/354 342/175 |
| 2016/0226570 A1* | 8/2016 | Nicholls | H04B 7/0897 |
| 2016/0254870 A1* | 9/2016 | O'Keeffe | H01Q 3/267 455/67.14 |
| 2017/0085005 A1* | 3/2017 | Aue | H03F 3/24 |
| 2017/0156069 A1* | 6/2017 | Moshfeghi | H04B 7/0697 |
| 2017/0181010 A1 | 6/2017 | Burgess et al. | |
| 2018/0074173 A1* | 3/2018 | Trotta | G01S 7/032 |
| 2018/0159599 A1 | 6/2018 | Sattinger et al. | |
| 2018/0352553 A1* | 12/2018 | Shtrom | H04B 17/318 |
| 2018/0376419 A1* | 12/2018 | Li | H04W 52/0235 |
| 2019/0027809 A1 | 1/2019 | Judkins et al. | |
| 2020/0091608 A1* | 3/2020 | Alpman | H01Q 5/47 |

* cited by examiner

ANTENNA-PARAMETER CONTROL IN A DISTRIBUTED SYSTEM

CROSS REFERENCE TO RELATED APPLICATIONS

This application claims priority under 35 U.S.C. 120 to U.S. patent application Ser. No. 16/025,528, "Antenna-Parameter Control in a Distributed System," by Anand Krishnamachari, William Buel, Craig Owens, and Eran Dor, filed on Jul. 2, 2018, and claims the benefit of U.S. Provisional Patent Application No. 62/528,069, "Antenna-Parameter Control in a Distributed System," by Anand Krishnamachari, William Buel, Craig Owens, and Eran Dor, filed on Jul. 1, 2017, the contents of both of which are herein incorporated by reference.

BACKGROUND

Field

The described embodiments relate to techniques for communicating information among electronic devices. In particular, the described embodiments relate to techniques for determining an antenna pattern, an antenna orientation and/or a transmit power in a distributed access point, in which an access-point module and an antenna module are coupled by a cable.

Related Art

Many electronic devices are capable of wirelessly communicating with other electronic devices. In particular, these electronic devices can include a networking subsystem that implements a network interface for: a cellular network (UMTS, LTE, etc.), a WLAN (e.g., a wireless network such as described in the Institute of Electrical and Electronics Engineers (IEEE) 802.11 standard or Bluetooth from the Bluetooth Special Interest Group of Kirkland, Wash.), and/or another type of wireless network. For example, many electronic devices communicate with each other via WLANs using an IEEE 802.11-compatible communication protocol (which are sometimes collectively referred to as 'Wi-Fi').

Many electronic devices are distributed, e.g., an antenna module may be physically separated from a power amplifier in an interface circuit or a radio. For example, in embedded access-point applications, an antenna module and access-point module may be coupled by a cable. Typically, the antenna module and the access-point module are separated by 0.5 to 3 m.

However, variation in the length of the cable during installation (and, thus, the separation of the antenna module and the access-point module) can adversely impact the communication performance. For example, in distributed systems with adjustable antenna patterns, electrical signals in the cable may include digital antenna control signals. These digital antenna control signals often include high-speed clock signals (such as 80 MHz). It is often difficult to communicate digital single-ended clock signals over long cable lengths. Therefore, the variation in the cable length may result in signal integrity issues (such as varying losses) in the clock signals in different installations.

Furthermore, the variation of the cable length can result in different radio-frequency attenuation in the cable. This results in different transmit power at the antenna-module input in different installations. In addition to degrading the communication performance and coverage area, the variation in the transmit power may result in difficulty in meeting regulatory requirements, because the access point may be expected to have the same equivalent isotropic radiated power in different installations.

SUMMARY

The described embodiments relate to an electronic device that provides modified electrical signals. This electronic device includes one or more antenna nodes that can couple, via a cable having a length, to an antenna module. Moreover, the electronic device includes an interface circuit communicatively coupled to the one or more antenna nodes. During operation, the electronic device provides, via the interface circuit, electrical signals for the antenna module, where the electrical signals correspond to an output transmit-power level at the interface circuit. Then, the electronic device receives, via the interface circuit, feedback about an input transmit-power level at the antenna module. Based on the feedback, the electronic device provides, via the interface circuit, modified electrical signals for the antenna module, where the modified electrical signals correspond to a modified output transmit-power level at the interface circuit.

Moreover, the modified output transmit-power level may be based on a data rate and/or a modulation and coding scheme.

Furthermore, in one operating mode, the interface circuit may provide, on the one or more antenna nodes, information that specifies an antenna pattern of the antenna module, and in a second operating mode, the interface circuit may receive, on the one or more antenna nodes, the feedback, so that the one or more antenna nodes are repurposed in the operating mode and the second operating mode.

Additionally, the feedback may specify a location of the electronic device, and the electronic device may determine a maximum antenna transmit power based on a regulation associated with the specified location. For example, the determining of the maximum antenna transmit power may involve the electronic device: providing, via the interface circuit, the specified location for a computer; and receiving, via the interface circuit, the maximum antenna transmit power associated with the computer.

In some embodiments, the feedback specifies an orientation of an antenna in the antenna module, and the electronic device specifies, via the interface circuit, an antenna pattern of the antenna based on the orientation. For example, the antenna pattern may include a transmit antenna pattern and/or a receive antenna pattern. Moreover, the electronic device may determine the output transmit-power level based on the orientation.

More generally, the electronic device may separately or concurrently modify the output transmit-power level and/or the antenna pattern based on the feedback, such as the input transmit-power level, the location and/or the orientation.

Another embodiment provides a computer-readable storage medium with a program module for use with the electronic device. When executed by the electronic device, this program module causes the electronic device to perform at least some of the aforementioned operations.

Another embodiment provides a method, which may be performed by the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
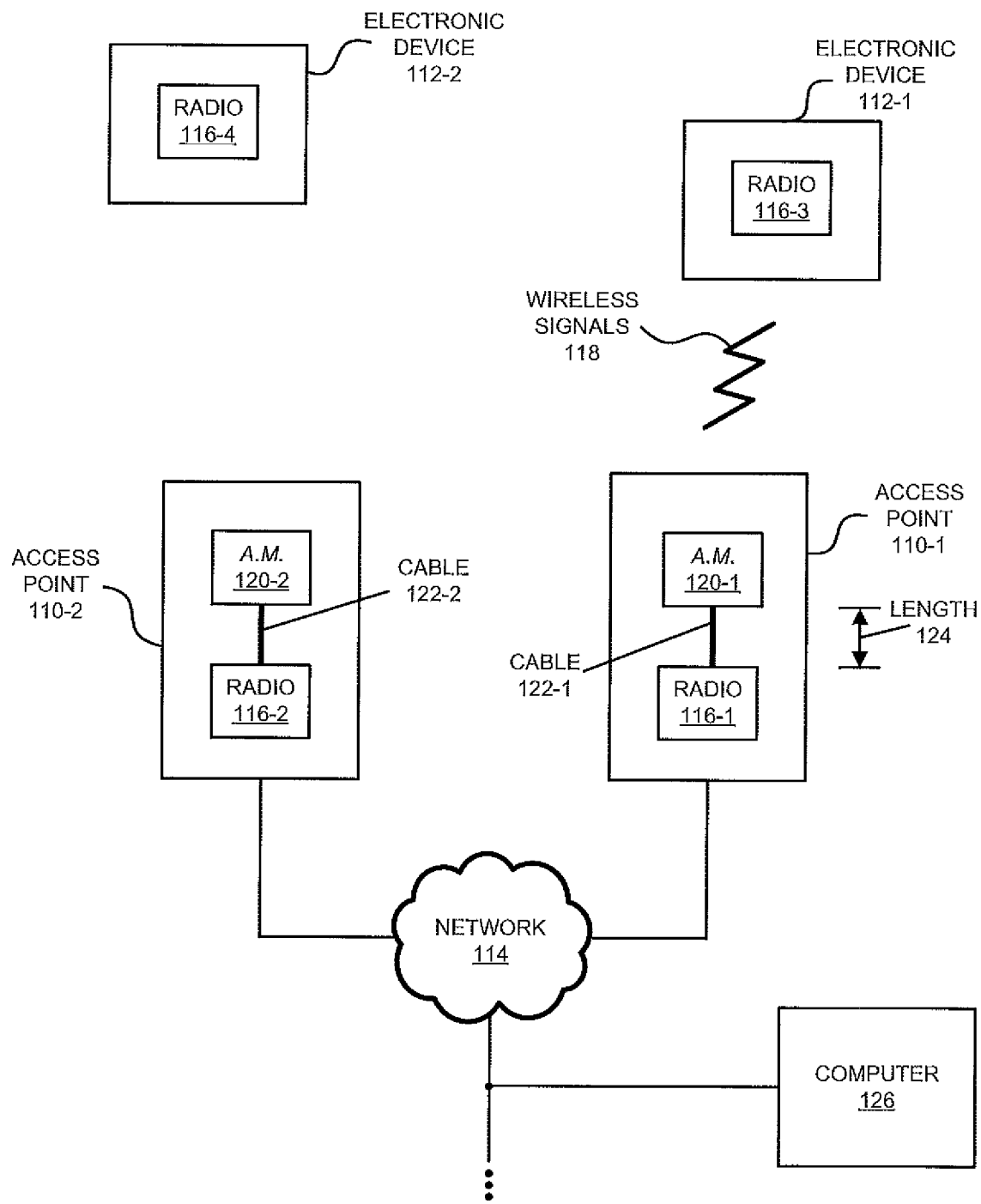
FIG. 1 is a block diagram illustrating communication among electronic devices in accordance with an embodiment of the present disclosure.

An electronic device that provides modified electrical signals is described. An interface circuit in the electronic device may provide electrical signals for an antenna module, which may be coupled to the interface circuit by a cable, and the electrical signals may correspond to or may specify an output transmit-power level at the interface circuit. Then, the interface circuit may receive feedback about an input transmit-power level at the antenna module. Based on the feedback, a data rate and/or a modulation and coding scheme, the interface circuit may provide the modified electrical signals for the antenna module, where the modified electrical signals correspond to a modified output transmit-power level at the interface circuit. In some embodiments, the feedback is provided by repurposing, during a different operating mode, signal lines that otherwise specify an antenna pattern.

Moreover, the feedback may specify a location of the electronic device, and the electronic device may determine a maximum antenna transmit power based on a regulation associated with the specified location. Alternatively or additionally, the feedback may specify an orientation of an antenna in the antenna module, and the interface circuit may specify an antenna pattern of the antenna based on the orientation, such as a transmit antenna pattern and/or a receive antenna pattern. Furthermore, the electronic device may determine the output transmit-power level based on the orientation.

By dynamically adapting the transmit power and/or the antenna pattern, this communication technique may allow the electronic device to adapt to changing environmental conditions, such as the details of how the electronic device and/or the antenna module are installed. For example, the communication technique may allow the electronic device to adapt to variations in the length of the cable, the orientation of the antenna and/or the orientation of the antenna module. Consequently, the communication technique may improve the communication performance of different installations of the electronic device and may help ensure regulatory compliance. Therefore, the communication technique may improve the user experience when communicating using the electronic device.

In the discussion that follows, the electronic device includes an access point communicates frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among one or more access points 110 and one or more electronic devices 112 (such as a cellular telephone) in accordance with some embodiments. In particular, access points 110 may communicate with each other using wireless and/or wired communication. Note that access points 110 may include a physical access point and/or a virtual access point that is implemented in software in an environment of an electronic device or a computer. In addition, at least some of access points 110 may communicate with electronic devices 112 using wireless communication.

The wired communication among access points 110 may occur via network 114 (such as an intra-net, a mesh network, point-to-point connections and/or the Internet) and may use a network communication protocol, such as Ethernet. Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wireless communication among access points 110 also involves the use of dedicated connections, such as via a peer-to-peer (P2P) communication technique.

Figure 6:
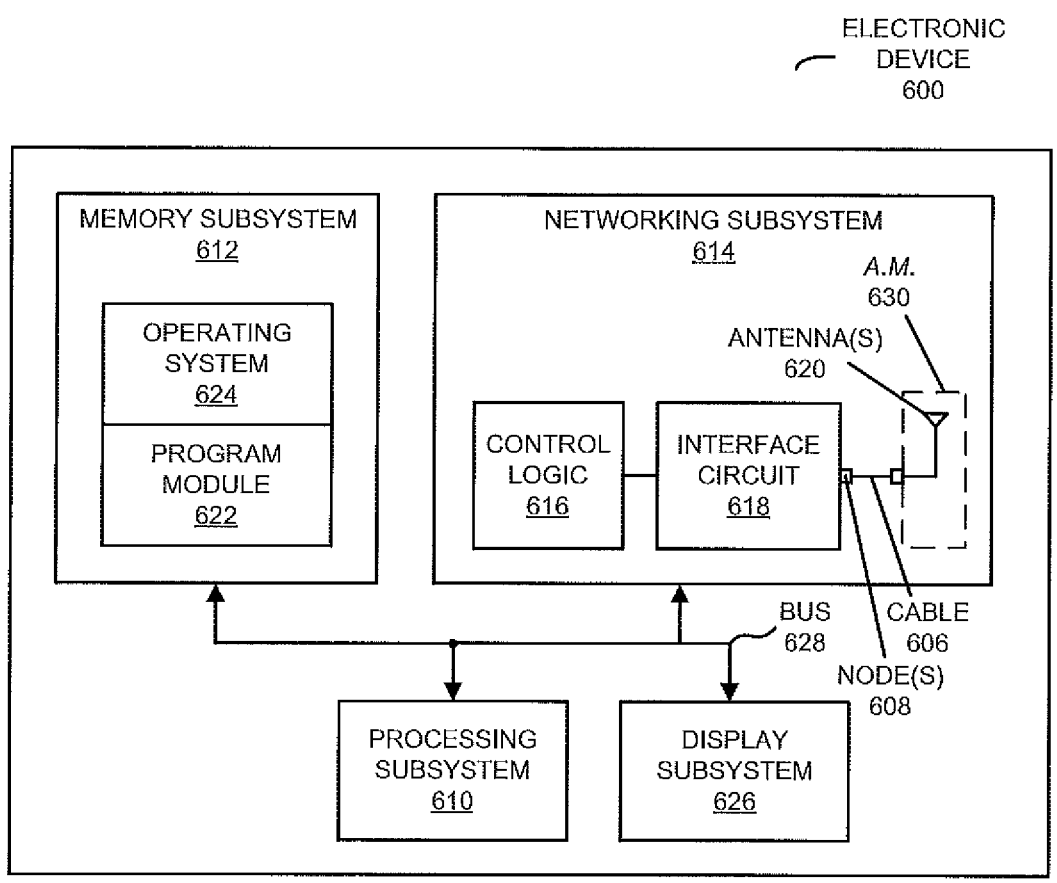
FIG. 6 is a block diagram illustrating an electronic device in accordance with an embodiment of the present disclosure.

As described further below with reference to FIG. 6, access points 110 and/or electronic devices 112 may include subsystems, such as a networking subsystem, a memory subsystem and a processor subsystem. In addition, access points 110 and electronic devices 112 may include radios 116 in the networking subsystems (which may include at least some of the functionality in an access-point module). More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/ management frames (such as association requests and responses) to establish a connection, configure security options (e.g., Internet Protocol Security), transmit and receive packets or frames via the connection, etc. Note that while instances of radios 116 are shown in access points 110 and electronic devices 112, one or more of these instances may be different from the other instances of radios 116.

As can be seen in FIG. 1, wireless signals 118 (represented by a jagged line) are transmitted from radio 116-1 in access point 110-1. These wireless signals may be received by radio 116-3 in electronic device 112-1. In particular, access point 110-1 may transmit frames or packets. In turn, these frames or packets may be received by electronic device 112-1. Moreover, access point 110-1 may allow electronic device 112-1 to communicate with other electronic devices, computers and/or servers via network 114.

Note that the communication among access points 110 and/or with electronic devices 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 seconds) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 118 with the packet or frame; decoding/extracting the packet or frame from received wireless signals 118 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, access points 110 may be distributed. In particular, radios 116 may be physically separated from and connected to antennas modules 120 by cables 122. (Note that a remainder of an access point, such as access point 110-1, except for antenna module (A.M.) 120-1 and cable 122-1, is sometimes referred to as an 'access-point module.') However, a length of cables 122 (such as a length 124 of cable 122-1) may vary. Consequently, the signal loss and, more generally, the signal degradation may varying among access points 110, which may adversely impact the communication performance.

Using access point 110-1 as an illustration, in the communication technique this challenge is addressed by adapting the transmit-power level output by radio 116-1 based on feedback about the transmit-power level at an input to antenna module 120-1. In particular, radio 116-1 may provide electrical signals for antenna module 120-1 that correspond to or specify an output transmit-power level. Then, radio 116-1 may receive the feedback about an input transmit-power level at antenna module 120-1. Based on the feedback, radio 116-1 may provide modified electrical signals for antenna module 120-1, where the modified electrical signals correspond to or specify a modified output transmit-power level at radio 116-1. In some embodiments, the modified output transmit-power level is based on a data rate and/or a modulation and coding scheme. For example, high-frequency signals in cable 122-1 may have higher attenuations, so radio 116-1 may pre-compensate the signals based on their frequency content using the modified output transmit-power level.

Moreover, antenna module 120-1 may provide the feedback to radio 116-1 by repurposing one or more control signal lines in cable 122-1 (such as two differential signal lines). For example, in one operation mode, radio 116-1 may provide, on one or more of the control signal lines, information that specifies an antenna pattern of antenna module 120-1 (such as a transmit antenna pattern or a receive antenna patter). Then, in a second operating mode, antenna module 120-1 provide the feedback on the one or more control signal lines, so that the one or more control signal lines are repurposed in the operating mode and the second operating mode.

Furthermore, antenna module 120-1 may determine a location of access point 110-1. For example, antenna module 120-1 may include a global positioning system (GPS) module or receiver. Alternatively or additionally, the location may be determined by communication with a WLAN and/or a cellular-telephone network. More generally, the location may be determined using triangulation and/or trilateration. Additionally, the feedback to radio 116-1 may specify the location. Based on the location, radio 116-1 may determine and provide, to antenna module 122-1, a maximum antenna transmit power based on a regulation associated with the specified location, such as a government regulation associated with wireless communication. In some embodiments, radio 116-1 determines the maximum antenna transmit power by providing, via network 114, the specified location to a remotely located computer 126 (such as a controller), and receiving, via network 114, information specifying the maximum antenna transmit power from computer 126 (such as in a frame or packet that is associated with computer 126). Note that the maximum antenna transmit power may constraint the output transmit-power level from radio 116-1. Thus, computer 126 may be used to remotely program the maximum antenna transmit power of access points 110 using a single look-up table, which may simplify the configuration and installation of access points 110 at disparate geographic locations.

Moreover, antenna module 120-1 may include an orientation sensor (such as an accelerometer and/or a gyroscope) that measures an orientation of an antenna in antenna module 120-1. Based on the orientation of the antenna, which may be included in or specified in the feedback, radio 116-1 may provide, to antenna module 122-1, an antenna pattern of the antenna, such as a transmit antenna pattern and/or a receive antenna pattern. As described further below with reference to FIG. 5, the antenna pattern may be omnidirectional or may have increased directionality relative to an omnidirectional antenna pattern (e.g., a primary lobe of the antenna pattern may be directed so that the transmitted energy to or the received energy from, e.g., electronic device 112-1 in increased, which may increase the communication performance (such as by improving one or more performance metrics). Alternatively or additionally, radio 116-1 may determine and provide, to antenna module 122-1, the output transmit-power level based on the orientation. For example, radio 116-1 may determine the antenna pattern and/or the output transmit-power level based on the orientation using a stored look-up table with predetermined or predefined values (such as a predetermined characterization of the optimal antenna pattern as a function of the orientation). Thus, access point 110-1 may be able to adjust the output transmit-power level and/or the antenna pattern if the orientation is incorrect or changed. For example, access point 110-1 may change a primary lobe of the antenna pattern so that it is correctly directed towards electronic device 112-1 and/or may increase the output transmit-power level.

Note that the adjustment of the output transmit-power level and/or the antenna pattern may occur: once (such as when access point 110-1 is powered on), as needed (such as based on one or more performance metrics or during debugging), periodically (such as every 5 min., 10 min, 30 min, 60 min, daily, etc.), or continuously.

In this way, the communication technique may allow access point 110-1 to customize or tailor output transmit-power level and/or the antenna pattern to correct for variations in length 124, the location and/or the orientation. Moreover, the communication may reduce the total number of signal lines that are used between radio 116-1 and antenna module 120-1, which may reduce the cost and complexity of access point 110-1. In addition, by facilitated automatic adaptation to the variations, the communication technique may eliminate the need for manual adjustment or configuration of each of access points 110.

Consequently, the closed-loop control in the communication technique may allow access point 110-1 (and, more generally, a distributed system) to adapt to changes. This capability may allow access points 110 to have improved communication performance (such as a reduced variation in one or more performance metrics) and to meet regulatory requirements. Therefore, the communication technique may facilitate an improved user experience when communicating information using access points 110.

Figure 2:
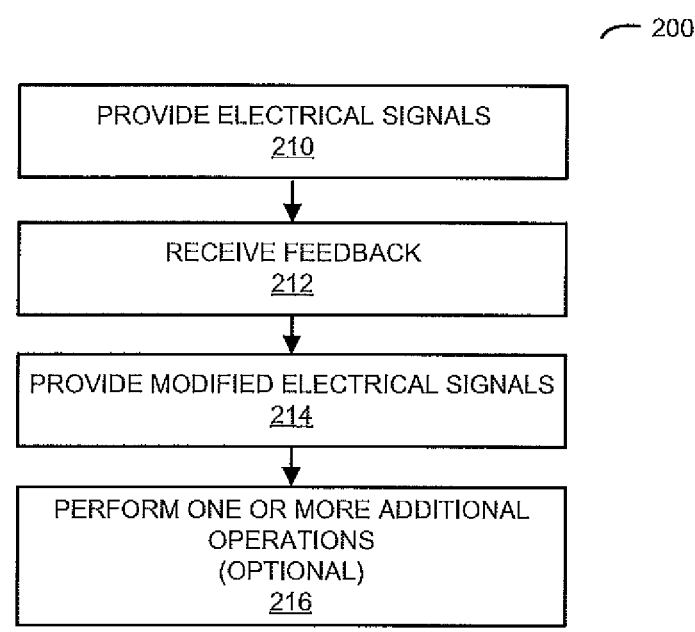
FIG. 2 is a flow diagram illustrating a method for providing modified electrical signals in one of the electronic devices in FIG. 1 in accordance with an embodiment of the present disclosure.

We now describe embodiments of the method. FIG. 2 presents a flow diagram illustrating an example of a method 200 for providing modified electrical signals, which may be performed by an interface circuit in an electronic device, such as radio 116-1 in electronic device 110-1 in FIG. 1. During operation, the interface circuit may provide electrical signals (operation 210) for an antenna module in the electronic device, where the electrical signals correspond to an output transmit-power level at the interface circuit. Then, the interface circuit may receive feedback (operation 212) about an input transmit-power level at the antenna module.

Based on the feedback, the interface circuit may provide modified electrical signals (operation 214) for the antenna module, where the modified electrical signals correspond to a modified output transmit-power level at the interface circuit. Note that the modified output transmit-power level may be based on a data rate and/or a modulation and coding scheme.

In some embodiments, the interface circuit optionally performs one or more additional operations (operation 216). For example, in one operating mode, the interface circuit may provide, on one or more antenna nodes, information that specifies an antenna pattern of the antenna module, and in a second operating mode, the interface circuit may receive, on the one or more antenna nodes, the feedback, so that the one or more antenna nodes are repurposed in the operating mode and the second operating mode.

Moreover, the feedback may specify a location of the electronic device, and the electronic device may determine a maximum antenna transmit power based on a regulation associated with the specified location. For example, the determining of the maximum antenna transmit power may involve the electronic device: providing, via the interface circuit, the specified location for a computer; and receiving, via the interface circuit, the maximum antenna transmit power associated with the computer.

Furthermore, the feedback may specify an orientation of an antenna in the antenna module, and the electronic device may specify, via the interface circuit, an antenna pattern of the antenna based on the orientation. For example, the antenna pattern may include a transmit antenna pattern and/or a receive antenna pattern. Additionally, the electronic device may determine the output transmit-power level based on the orientation.

In some embodiments of method 200, there may be additional or fewer operations. Furthermore, the order of the operations may be changed, and/or two or more operations may be combined into a single operation.

Figure 3:
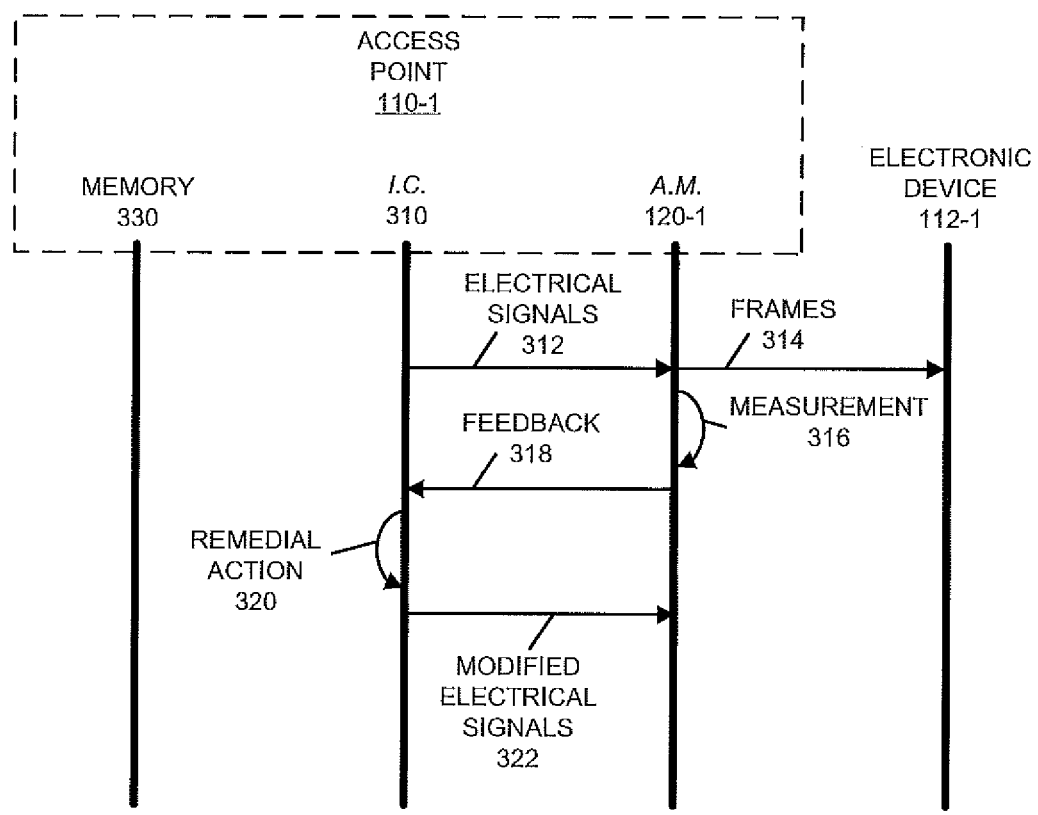
FIG. 3 is a drawing illustrating communication among the electronic devices in FIG. 1 in accordance with an embodiment of the present disclosure.

Embodiments of the communication technique are further illustrated in FIG. 3, which presents a drawing illustrating an example of communication among interface circuit 310 (such as radio 116-1 in FIG. 1) and antenna module 120-1 in access point 110-1, and electronic device 112-1. In particular, access point 110-1 may transmit one or more frames or packets 314 to electronic device 112-1. (While FIG. 3 illustrates unilateral communication between access point 110-1 and electronic device 112-1, in other embodiments the communication is bilateral.) This may involve interface circuit (I.C.) 310 providing electrical signals 312 to antenna module 120-1. Note that electrical signals 312 may correspond to an output transmit-power level at interface circuit 310.

Then, one or more measurement devices in antenna module 120-1 may perform one or more measurements 316, and antenna module 120-1 may provide feedback 318 that specifies the one or more measurements 316 to interface circuits 310. For example, access point 110-1 may repurpose one or more signal lines between interface circuit 310 and antenna module 120-1, so antenna module 120-1 can provide feedback 318 to interface circuit 310.

After receiving feedback 318, interface circuit 310 (and/or access point 110-1) may perform a remedial action 320. For example, the one or more measurements 316 may include an input transmit-power level at antenna module 120-1, and remedial action 320 may include interface circuit 310 providing modified electrical signals 322 to antenna module 120-1, where the modified electrical signals correspond to a modified output transmit-power level at interface circuit 310.

Alternatively or additionally, feedback 318 may specify a location of access point 110-1, and remedial action 320 may include access point 110-1 determining a maximum antenna transmit power based on a regulation associated with the specified location. For example, the determining of the maximum antenna transmit power may involve interface circuit 310 providing the specified location to a computer (such as a controller) and subsequent receiving the maximum antenna transmit power from the computer.

In some embodiments, feedback 318 may specify an orientation of an antenna in antenna module 120-1, and remedial action 320 may include interface circuit 310 specifying an antenna pattern of the antenna based on the orientation. For example, the antenna pattern may include a transmit antenna pattern and/or a receive antenna pattern. Additionally, interface circuit 310 may include providing modified electrical signals 322 to antenna module 120-1, where the modified electrical signals correspond to a modified output transmit-power level at interface circuit 310 based on the orientation.

Figure 4:
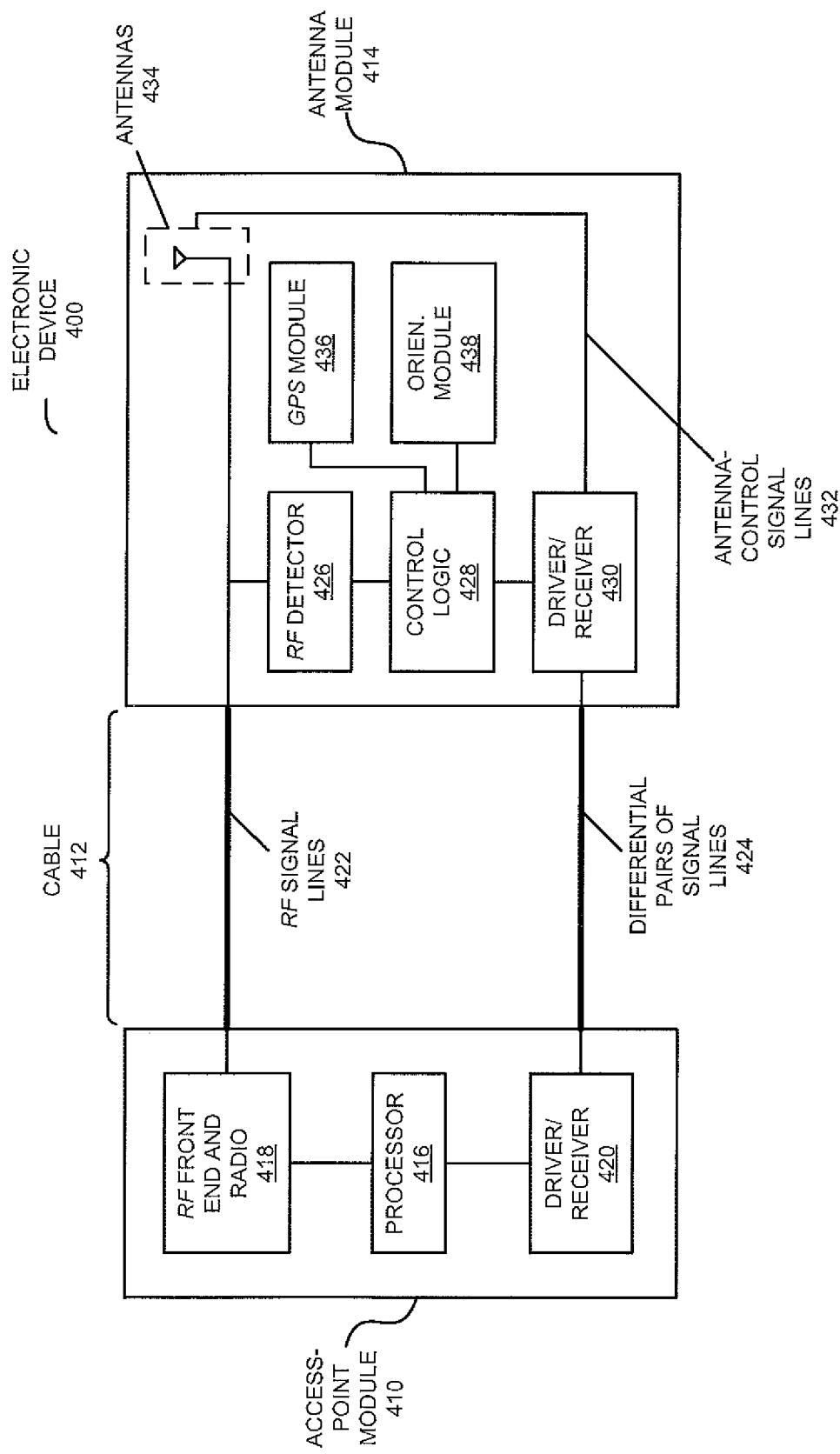
FIG. 4 is a drawing illustrating a distributed system in one of the electronic devices in FIG. 1 in accordance with an embodiment of the present disclosure.

In some embodiments, the feedback in the communication technique is provided by repurposing two or more control signal lines. This is shown in FIG. 4, which presents a drawing illustrating an example of a distributed system in an electronic device 400. In particular, electronic device 400 may include: access-point module 410, cable 412 and antenna module 414. Moreover, access-point module 410 may include: a processor 416, radio-frequency (RF) front end and radio 418, and a driver/receiver 420. Furthermore, cable 412 may include RF signal lines 422 and differential pairs of signal lines 424 for differential signals. For example, cable 412 may include an RJ50 cable and associated connectors. Additionally, antenna module 412 may include: an RF detector 426, control logic 428 (such as a programmable logic device with an analog-to-digital converter or ADC), a driver/receiver 430, antenna-control signal lines 432, one or more antennas 434, an optional GPS module 436 and an optional orientation module 438.

During a normal operating mode, RF front end and radio 418 may provide, on RF signal lines 422, electrical signals corresponding to a frame or packet that is to be transmitted by the one or more of antennas 434. Moreover, driver/receiver 420 may provide, on differential pairs of signal lines 424, differential signals that specify an antenna pattern (such as a transmit antenna pattern and/or a receive antenna pattern) of the one or more of antennas 434. For example, driver/receiver 420 may convert single-ended antenna digital control signals from processor 416 into the differential signals (note that the use of differential signaling may facilitate high speeds while being cost effective). After receiving the differential signals, driver/receiver 430, may convert the differential signals into the single-ended digital control signals and may set the antenna pattern of the one or more antennas 434 via antenna-control signal lines 432.

Then, in a feedback operating mode, RF detector 426 (such as a Schottky diode) and control logic 428 may measure the input transmit-power level of the electronic signals on RF signal lines 422 at inputs to antenna module 412. Next, driver/receiver 430 may convert the measured input transmit-power level into differential feedback signals and may provide, via differential pairs of signal lines 424, these feedback signals about the measured input transmit-power level to driver/receiver 420. After receiving the differential feedback signals, driver/receiver 420 may convert the differential feedback signals into single-ended feedback. This single-ended feedback may be used by processor 416 to modify the output transmit-power level. Moreover, based on the modified output transmit-power level, RF front end and radio 418 may modify the output transmit-power level specified by the electrical signals, such as by changing the gain of a power amplifier, thereby obtaining the correct transmit power at the one or more antennas 434. For example, the output transmit-power level from RF front end and radio 418 may be set to the maximum output transmit-power level (such as 20 or 22 dBm) based on the longest length of cable 412 (such as 3 m). Then, based on the feedback (which, via the measurements at antenna module 414), may specify the actual cable length), the output transmit-power level may be reduced.

In some embodiments, optional GPS module 436 determines a location of electronic device 400 and/or optional orientation module 438 determines an orientation of the one or more antennas 434. For example, via differential pairs of signal lines 424, processor 416 may send instructions to optional GPS module 436 to determine the location. Moreover, the information specifying the determined location and/or the determined orientation may be included in the feedback. Based on this information, processor 416 may modify the output transmit-power level specified by the electrical signals and/or the antenna pattern specified by the antenna digital control signals during the normal operation mode may be changed.

Note that in the feedback operating mode, the one or more antennas 434 may be set to an omnidirectional antenna pattern when the differential pairs of signal lines 424 are conveying the digital feedback signals so that a connection with a client (such as electronic device 112-1 in FIG. 1) is not lost during this period. Moreover, there may not be a degradation in the overall communication performance during the period because the feedback data transfer may be small (i.e., short) and infrequent.

Figure 5:
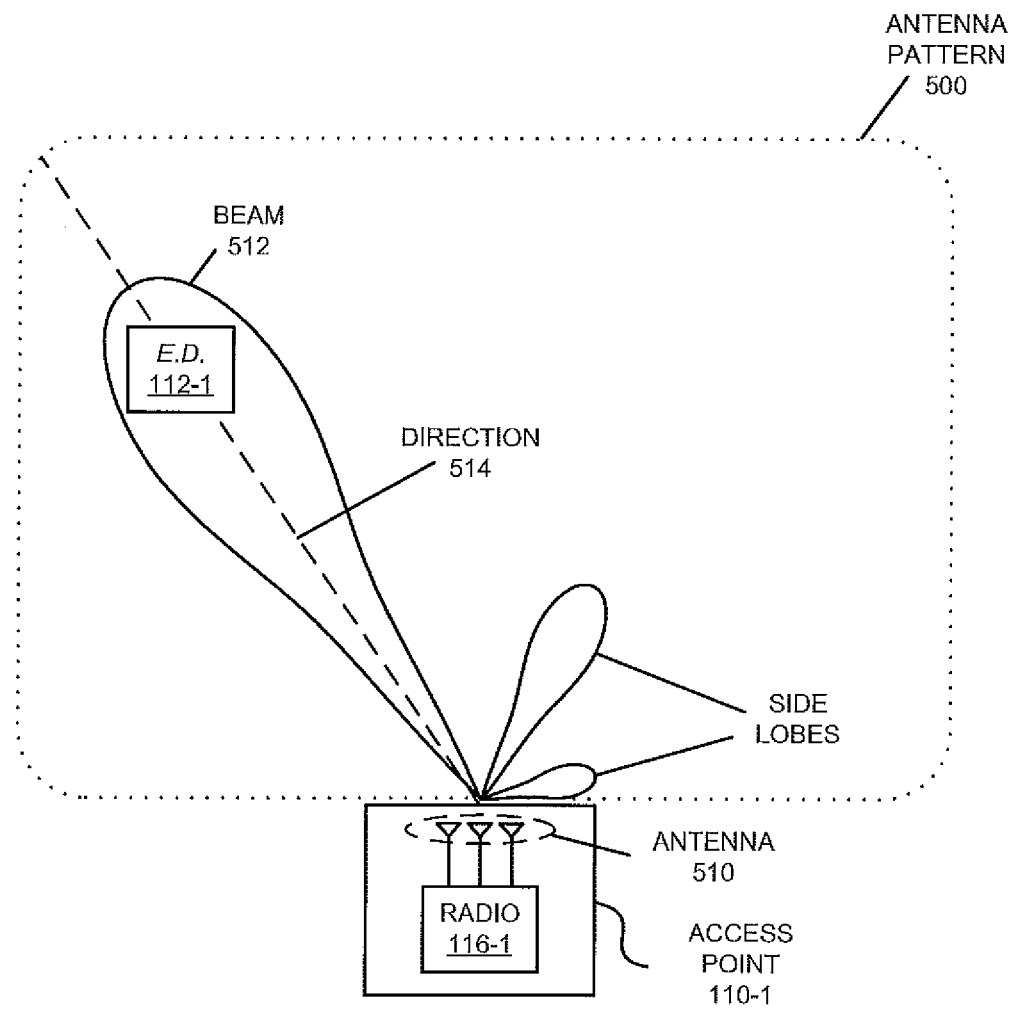
FIG. 5 is a drawing illustrating an antenna pattern of an antenna in one of the electronic devices in FIG. 1 in accordance with an embodiment of the present disclosure.

FIG. 5 presents a drawing illustrating an antenna pattern of an antenna in access point 110-1. In particular, access point 110-1 may configure antenna elements in antenna 510 to select a direction 514 of a primary beam 512 in antenna pattern 500. This selective directionality may improve the sensitivity when access point 110-1 transmits or receives a frame or a packet.

For example, an interface circuit in radio 116-1 may provide control signals or settings that adapt or change antenna pattern 500 of antenna 510. In particular, the control signals or settings may independently and selectively electrically couple pattern shapers or antenna elements (such as reflectors) in antenna 510 to ground in order to steer antenna pattern 500 in different directions (such as direction 514). Thus, if one or more antennas elements in antenna 510 include N antenna pattern shapers, antenna 510 may have $2^N$ different antenna pattern configurations. More generally, a given antenna pattern may include amplitudes and/or phases of signals that specify a direction of the main or primary lobe or beam 512 of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam 512) that directs gain in direction 514 of, e.g., electronic device (E.D.) 112-1 that is of interest and/or one or more local minima that reduce gain in the direction of other electronic devices that are not of interest. More generally, antenna pattern 500 may have N beams at locations of electronic devices (such as electronic device 112-1) that will transmit to or that will receive from access point 110-1 in the subsequent time interval and/or M exclusion zones at the locations of electronic devices that will not transmit to or receive from access point 110-1 in the subsequent time interval, where N and M are integers. For example, antenna 510 may include M+1 antenna elements and there may be M exclusion zones. In this way, the given antenna pattern may be selected so that communication that is undesirable (such as with the other electronic devices) is avoided to reduce or eliminate adverse effects (such as interference or crosstalk) and to increase the sensitivity of transmissions to or from electronic device 112-1.

In some embodiments, if antenna 510 is pointed or oriented in an incorrect manner, antenna pattern 500 is modified so that direction 514 in antenna pattern 500 is correct, such as in a horizontal direction or in a direction of electronic device 112-1.

We now describe embodiments of an electronic device, which may perform at least some of the operations in the communication technique. FIG. 6 presents a block diagram illustrating an electronic device 600 in accordance with some embodiments, such as one of access points 110 or electronic devices 112. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs or program modules may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618, a cable 606 and one or more antennas 620 (or antenna elements) in an antenna module 630. (While FIG. 6 includes antenna module 630, in some embodiments electronic device 600 includes one or more nodes, such as nodes 608, e.g., a pad, which can be coupled to antenna module 630. Thus, electronic device 600 may or may not include antenna modules 630. Note that the one or more nodes 608 may constitute input(s) to and/or output(s) from electronic device 600.) For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 600 may be adapted or changed using pattern shapers (such as reflectors) in one or more antennas 620 (or antenna elements), which can be independently and selectively electrically coupled to ground to steer the transmit antenna pattern in different directions. Thus, if one or more antennas 620 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program module 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Note that the communication technique may occur while processing system 610 executes program module 622. Thus, the communication technique may be implemented at run-time of program module 622. Alternatively or additionally, at least some of the operations in the communication technique may be implemented in a physical layer, such as hardware in interface circuit 618.

Moreover, while the preceding embodiments illustrated the communication technique while an access point transmits to or receives a frame or a packet from an electronic device, in some embodiments the access point may concurrently transmit to or receive frames or packets from two or more electronic devices. For example, the communication protocol in a WLAN may use orthogonal frequency division multiple access (OFDMA).

While the preceding embodiments illustrated closed-loop control of the transmit-power level, separately or additionally the communication technique may be used for closed-loop control of the antenna transmit power based on the location and/or closed-loop control of the antenna pattern based on the orientation.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
  one or more antenna nodes configured to couple, via a cable, to an antenna module; and an interface circuit communicatively coupled to the one or more antenna nodes, wherein the electronic device is configured to:
- receive, via the interface circuit, feedback associated with the antenna module about an input transmit-power level at the antenna module, wherein the feedback is conveyed on a subset of the cable, the one or more antenna nodes associated with the subset of the cable are configured to be repurposed to convey different types of measurements in the feedback associated with the antenna module or information intended for the antenna module, and the different types of measurements are other than measurements associated with wireless communication; and
- provide, via the interface circuit and intended for the antenna module, a modified transmit-power level based at least in part on an antenna pattern of an antenna in the antenna module and the feedback.

2. The electronic device of claim 1, wherein the antenna pattern includes one of: a transmit antenna pattern, and a receive antenna pattern.

3. The electronic device of claim 1, wherein the antenna pattern has increased directionality relative to an omnidirectional antenna pattern based at least in part on a location of a second electronic device or a horizontal direction.

4. The electronic device of claim 1, wherein the electronic device is configured to determine the antenna pattern based at least in part on a location of the antenna module or the electronic device.

5. The electronic device of claim 1, wherein the electronic device is configured to:
- determine an output transmit-power level based at least in part on a location of the electronic device; and
- provide, via the interface circuit, electrical signals intended for the antenna module, wherein the electrical signals correspond to the output transmit-power level at the interface circuit.

6. The electronic device of claim 5, wherein the feedback specifies a location of the electronic device; and
wherein the output transmit-power level is based at least in part on a maximum antenna transmit power associated with the specified location.

7. The electronic device of claim 1, wherein, in one operating mode, the interface circuit provides, on the one or more antenna nodes and intended for the antenna module, information that specifies the antenna pattern of the antenna module; and
wherein, in a second operating mode, the interface circuit receives, on the one or more antenna nodes, the feedback, so that the one or more antenna nodes are repurposed in the operating mode and the second operating mode.

8. The electronic device of claim 7, wherein the antenna pattern is omnidirectional during the second operating mode.

9. A non-transitory computer-readable storage medium for use in conjunction with an electronic device, the computer-readable storage medium storing program instructions that, when executed by the electronic device, provide a modified transmit-power level by causing the electronic device to perform operations comprising:
- receiving feedback associated with the antenna module about an input transmit-power level at the antenna module, wherein the antenna module is separate from the electronic device and the electronic device is coupled to the antenna module via a cable, wherein the feedback is conveyed on a subset of the cable, one or more antenna nodes in the electronic device associated with the subset of the cable are repurposed to convey different types of measurements in the feedback associated with the antenna module or information intended for the antenna module, and the different types of measurements are other than measurements associated with wireless communication; and
- providing, intended for the antenna module, the modified transmit-power level based at least in part on an antenna pattern of an antenna in the antenna module and the feedback.

10. The non-transitory computer-readable storage medium of claim 9, wherein the antenna pattern includes one of: a transmit antenna pattern, and a receive antenna pattern.

11. The non-transitory computer-readable storage medium of claim 9, wherein the antenna pattern has increased directionality relative to an omnidirectional antenna pattern based at least in part on a location of a second electronic device or a horizontal direction.

12. The non-transitory computer-readable storage medium of claim 9, wherein the operations comprise determining the antenna pattern based at least in part on a location of the antenna module or the electronic device.

13. The non-transitory computer-readable storage medium of claim 9, wherein the operations comprise:
- determining an output transmit-power level based at least in part on a location of the electronic device; and
- providing electrical signals intended for the antenna module, wherein the electrical signals correspond to the output transmit-power level at the interface circuit.

14. The non-transitory computer-readable storage medium of claim 13, wherein the feedback specifies a location of the electronic device; and
wherein the output transmit-power level is based at least in part on a maximum antenna transmit power associated with the specified location.

15. The non-transitory computer-readable storage medium of claim 9, wherein the operations comprise:
- in an operating mode, providing, on the one or more antenna nodes and intended for the antenna module, information that specifies the antenna pattern of the antenna module; and
- in a second operating mode, receiving, on the one or more antenna nodes, the feedback, so that the one or more antenna nodes are repurposed in the operating mode and the second operating mode.

16. The non-transitory computer-readable storage medium of claim 15, wherein the antenna pattern is omnidirectional during the second operating mode.

17. A method for providing a modified transmit-power level, comprising:
by an electronic device:
- receiving feedback associated with the antenna module about an input transmit-power level at the antenna module, wherein the antenna module is separate from the electronic device and the electronic device is coupled to the antenna module via a cable, wherein the feedback is conveyed on a subset of the cable, one or more antenna nodes in the electronic device associated with the subset of the cable are repurposed to convey different types of measurements in the feedback associated with the antenna module or information intended for the antenna module, and the different types of measurements are other than measurements associated with wireless communication; and providing, intended for the antenna module, the modified transmit-power level based at least in part on an antenna pattern of an antenna in the antenna module and the feedback.

18. The method of claim 17, wherein the method comprises determining the antenna pattern based at least in part on a location of the antenna module or the electronic device.

19. The method of claim 17, wherein the method comprises determining the antenna pattern based at least in part on a location of the antenna module or the electronic device.

20. The method of claim 17, wherein the method comprises:
- in an operating mode, providing, on the one or more antenna nodes and intended for the antenna module, information that specifies the antenna pattern of the antenna module; and
- in a second operating mode, receiving, on the one or more antenna nodes, the feedback, so that the one or more antenna nodes are repurposed in the operating mode and the second operating mode.

* * * * *